United States Patent [19]

Blessent

[11] 4,116,283
[45] Sep. 26, 1978

[54] AGRICULTURAL TILLAGE EQUIPMENT

[76] Inventor: John B. Blessent, R.R. #1, Urbana, Ill. 61801

[21] Appl. No.: 745,301

[22] Filed: Nov. 26, 1976

Related U.S. Application Data

[63] Continuation-in-part of Ser. No. 588,070, Jun. 18, 1975, abandoned.

[51] Int. Cl.² ............................................. A01B 59/043
[52] U.S. Cl. ...................................................... 172/443
[58] Field of Search .................................. 172/439–451

[56] References Cited

U.S. PATENT DOCUMENTS

| | | | |
|---|---|---|---|
| 2,612,825 | 10/1952 | Walker .............................. | 172/443 X |
| 3,289,771 | 12/1966 | Bennett ............................ | 172/448 X |
| 3,472,528 | 10/1969 | Richey et al. ................... | 172/439 X |
| 3,578,090 | 5/1971 | Cline ................................ | 172/439 |
| 4,073,346 | 2/1978 | Groth et al. ..................... | 172/443 X |

FOREIGN PATENT DOCUMENTS

| | | | |
|---|---|---|---|
| 1,088,474 | 9/1954 | France ..................................... | 172/443 |
| 1,187,502 | 3/1959 | France ..................................... | 172/448 |
| 1,009,414 | 5/1957 | Fed. Rep. of Germany ........... | 172/439 |

*Primary Examiner*—Paul E. Shapiro
*Attorney, Agent, or Firm*—Wegner, Stellman, McCord, Wiles & Wood

[57] ABSTRACT

An agricultural implement support with dual three-point hitch capabilities for supporting a combination of two different implements from a single frame controllable by a three-point hitch lifting attachment on a farm tractor. The hitch provides for the pulling of two implements simultaneously through a field to cut down expense, while providing complete operator control over lifting both implements with tractor power lift and adjusting depth of both implements relative to the tractor and to each other.

4 Claims, 7 Drawing Figures

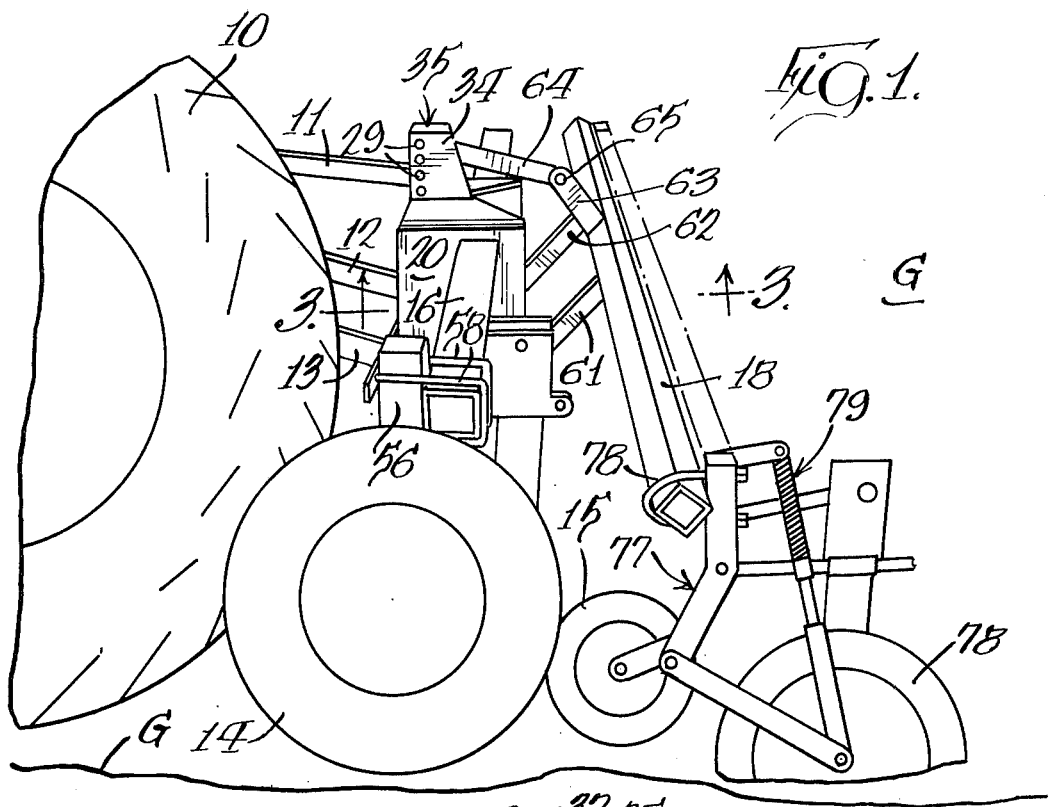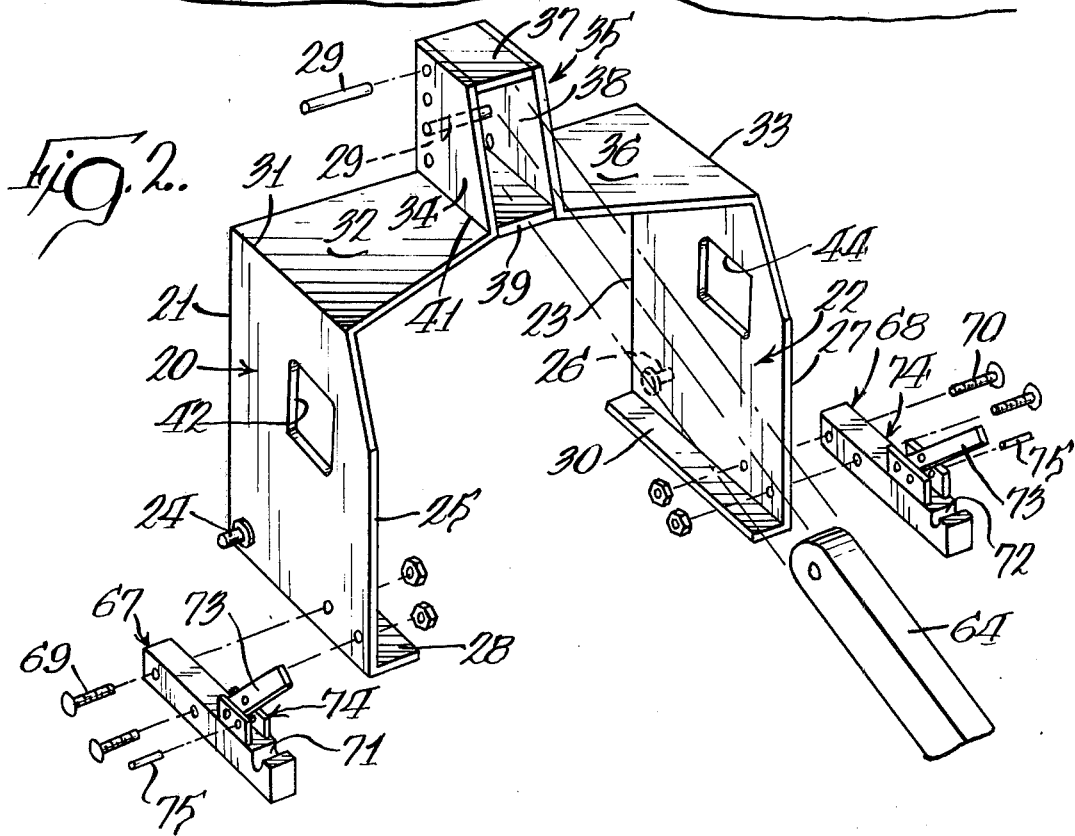

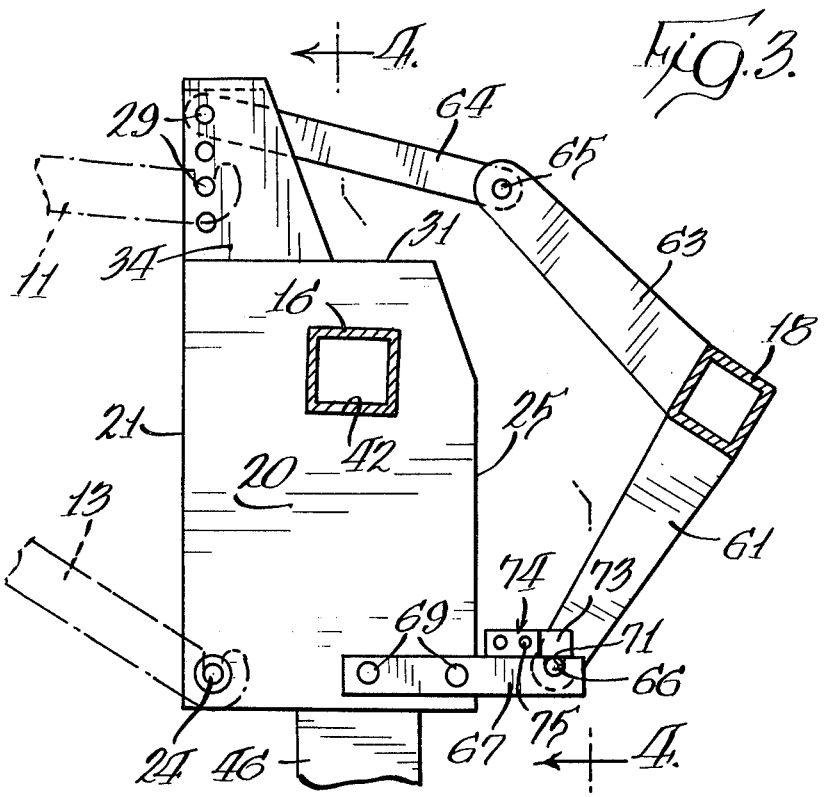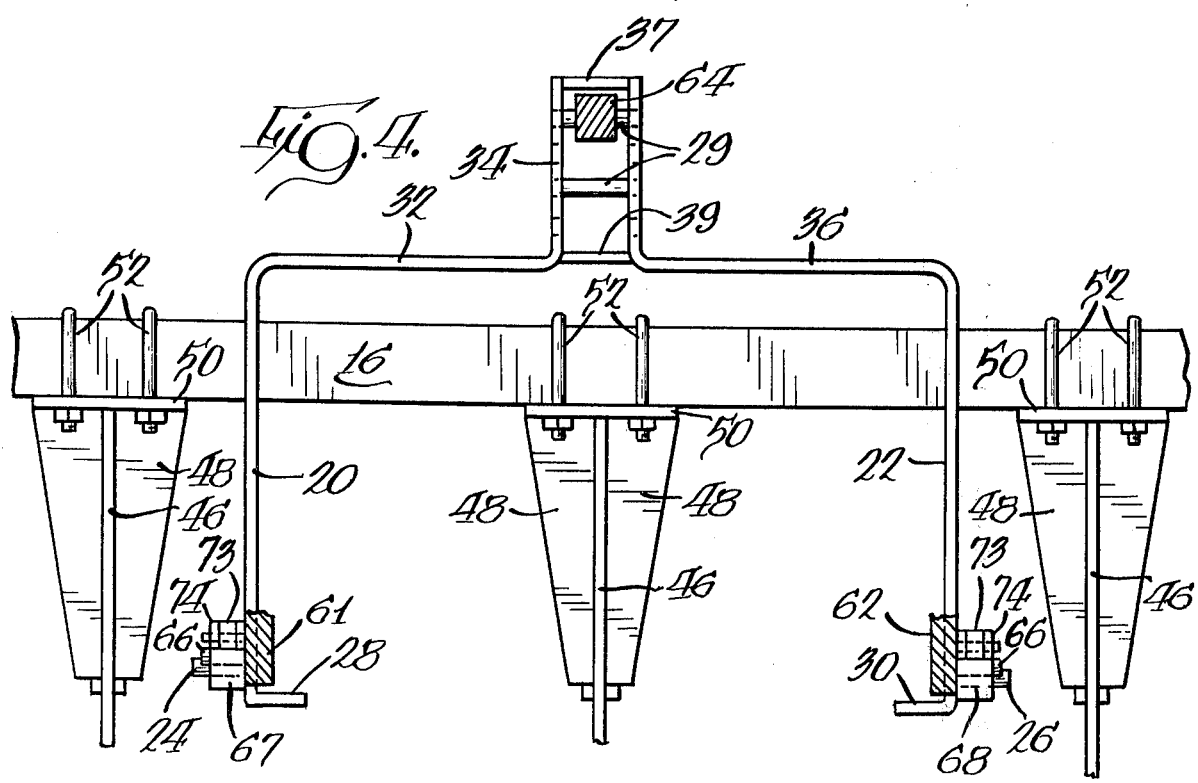

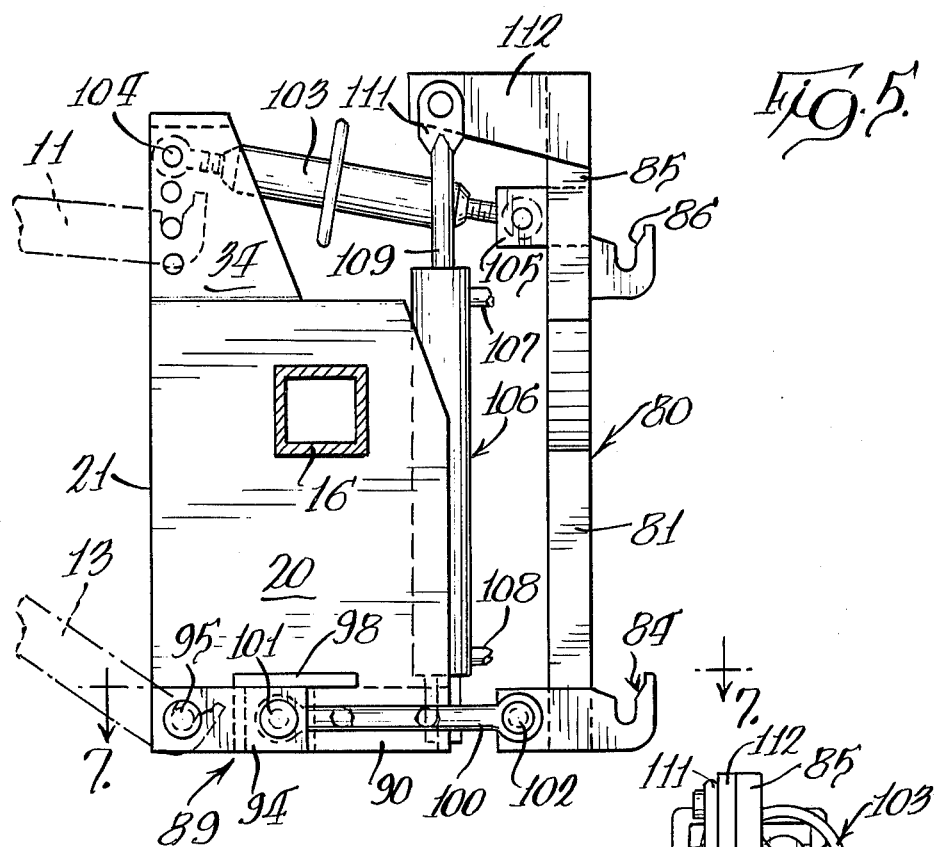

AGRICULTURAL TILLAGE EQUIPMENT

This application is a continuation-in-part of my U.S. application Ser. No. 588,070 filed June 18, 1975, now abandoned.

BACKGROUND OF THE INVENTION

Various operations in farm field crop growing require the pulling of implements over the field, usually accomplished by several passes, each with a single implement. The power available in most farm tractors is sufficient to operate more than one implement at a time, but appropriate mounting for the implements has not been provided. For example, a chisel implement for breaking up the soil for moisture penetration may be pulled ahead of a cultivator which will weed and mulch the soil, leaving a top layer in a condition to prevent loss of moisture from the soil by evaporation. Soil compaction from tractor wheels may thus be eliminated. Generally, the depth of running of a chisel in the ground is less than plowing so that sufficient drawbar pull of the conventional farm tractor is available. Other operations, such as seeding, planting, fertilizing or application of other chemicals, may be performed behind a chisel or a cultivator.

There is a need for a tool bar support particularly adapted and useful for mounting a plurality of a variety of tools. At the same time, the tools of the implements should be fully capable of being elevated by the hydraulic lift mechanism of a three-point hitch equipped tractor. Single chisel implements have been utilized with farm tractors and typical of such are U.S. Pat. Nos. 3,042,118 and 3,170,421.

Attempts have been made at mounting more than one agricultural implement from a tractor even though such structures have proven generally inadequate for the purpose. Typical of such is U.S. Pat. No. 3,826,314.

SUMMARY OF THE INVENTION

A principal object of this invention is to provide a new and improved dual three-point hitch support for utilizing tool farm field implements during a single pass over a field.

Another object is to provide a particularly strong and efficient frame support for tool mounting bars cantilevered therefrom and mechanism providing full control of more than one set of implements, through the lift apparatus of the farm tractor and auxiliary lift mechanism incorporated into the dual support.

Another object is to provide a dual three-point hitch for farm implements which may be easily mounted and dismounted from the tractor, and the implements from each other.

DESCRIPTION OF THE DRAWINGS

FIG. 1 is a fragmentary view of the tillage equipment of this invention associated with the tractor, with parts removed for clarity of illustration;

FIG. 2 is a perspective, exploded view of the main frame of the dual three-point hitch arrangement of this invention;

FIG. 3 is a side elevational view, partially in section and partially diagrammatic, of the main frame of the three-point hitch of this invention generally taken along line 3—3 in FIG. 1;

FIG. 4 is a fragmentary sectional view taken substantially along line 4—4 in FIG. 3;

FIG. 5 is a side elevational view of the main frame of the invention showing a preferred embodiment for coupling a second implement to the first;

FIG. 6 is a rear elevational view of the structure illustrated in FIG. 5; and

FIG. 7 is a sectional view substantially along line 7—7 in FIG. 5 showing the structure of the mounting pin bracket.

DESCRIPTION OF THE PREFERRED EMBODIMENT

A farm tractor equipped with relatively large rubber tired rear wheels 10 for running upon the ground of a grain field G is equipped generally with a three-point, free-link power hydraulically operated lift hitch, as is well understood, including an upper arm 11 and a pair of lower arms 12 and 13. The implements that may be attached to such a tractor may be lifted out of the ground by the hydraulic mechanism on the tractor itself. During operation the lift mechanism may lower the implement to run in the field, such that depth will be governed by ground engaging wheels 14 associated with the front implement and wheels 15 associated with a rear implement.

The present invention is illustrated in the drawings wherein chisel tools may be supported from an implement bar 16 and cultivator tools supported from another implement bar 18. Both implement bars are supported from the main frame of the dual three-point hitch implement attachment in two preferred embodiments.

The main frame is best illustrated in FIGS. 2, 3 and 4. The frame components are made of relatively heavy steel plate including a pair of spaced upright plate parts 20 and 22 having front edges 21 and 23 extending generally upright in a common vertical plane and extending to rear edges 25 and 27 spaced rearwardly a distance substantially greater than the dimensions of a tool bar, such as 16. In the present invention, tool bar 16 is a 5 inch square beam, substantially unbendable under any forces that might be applied thereto by the support of chisel points being dragged through the soil of a farm field.

Each upright plate 20 and 22 has an inwardly extending flange 28 and 30 which provides rigidity to the lower ends of the plates. The single plate 20 has a flat inwardly extending portion 32, formed by bending of the plate about a bend line 31, and an upwardly extending portion 34 forming one side of a box beam section or mast section 35 centrally at the top of the frame. Similarly, the right-hand side plate 22 is bent at a line 33 with an inwardly extending portion 36, again bent upwardly to form the right-hand side 38 of the box beam or mast section 35. The top of the upwardly extending sides 34 and 38 of the box beam is enclosed by a spacer plate 37 and the bottom by a similar spacer plate 39, each welded at its edges to the plates 34 and 38 so that the box beam section is open forwardly and rearwardly. The mast thus constituted is a particularly strong and rigid frame capable of supporting the tools without bending materially from the shape illustrated. The box beam section 35 is narrower at its top along the spacer bar 37 than at its bottom along spacer bar 39. Each of the generally outwardly and inwardly extending plates 32 and 36 are of equal width with the box section at the bottom of the plates 34 and 38 and increased in width toward the bent lines 31 and 32, which is the junction with the upright plates 20 and 22. While single plate material may be bent to form the upright plates 20, the inwardly extending plate 32 and the left-hand side 34 of the box beam section, individual plates may be formed and welded at the junctions 31 and 41 shown in FIG. 2, if it is so desired. Care should be taken to provide the frame with sufficient rigidity under influence of applied working loads.

The front tool bar 16 is insertable through aligned square openings 42 in the plate 20 and 44 in the plate 22. The two plates thus support the bar in its cantilevered position extending through the plates and to the left and right of the center position behind the tractor. To this bar may be attached the shanks 46 of chisel supporting points, the shank being an upright plate reinforced by fillet plates 48 on either side welded to a flat support plate 50 at the top which may be secured against the underside of the beam by U-bolts 52. Other implements may be attached to the bar as required. The ground depth engaging wheels 14 may have an upright bar support 56 (FIG. 1) similarly attached in an adjustable height fashion to the bar by U-bolts 58. The tractor three-point hitch hydraulics are used to ensure penetration of the chisels to the desired depth in the ground.

The main frame is equipped for easy and quick attachment to the three-point hitch lifting bars 11, 12 and 13 of the tractor. A pin 24 extends outwardly from the lower front corner of the upright plate 20. A similar pin 26 extends outwardly from the lower front corner of the plate 22. These pins are in a position to be received by the lower lift bars of the conventional three-point hitch (shown diagrammatically without the known detail structure). In the mast section centered in the frame and extending between the side plates 34 and 38 are a plurality of holes to receive one or more pins 29. These pins are in a position to receive the upper lift arm 11 of the conventional three-point hitch equipped tractor. The use of the pins 24, 26 and 29 with a conventional three-point hitch attachment is well understood. The pins are placed on the frame in a position to receive such a hitch.

A rear or second implement tool bar 18 may be provided with lower spaced arms 61 and 62 and an upper arm 63 conventionally in a position to attach directly to the three-point hitch of a tractor. The second tool bar may be mounted to the rear of the main frame of this implement. In order to so mount a second tool bar, a single link 64 is pinned at 65 to the upper arm 63 of the tool bar and pivoted about one of the pins 29 provided in the box section of the frame. Height adjustment is made by selection of location of the pin 29 in the plurality of openings illustrated in the box section.

Means are provided for supporting pins 66 conventionally provided on the lower arms 61 and 62 from the trailing lower edge of the frame. This means is particularly illustrated in FIGS. 2, 3 and 4 as a pair of lower hitch bars 67 and 68, each secured to the lower rear portion of the upright plates 20 and 22 by bolts 67 and 70. Each bar has an exposed notch 71 and 72 to receive the pins, such as 66 (FIG. 3). A locking bar 73 is pivoted in upright brackets 74 in a position to extend over the notches 71 and 72 and to be held in place with a pin 75. Once the second implement bar pins, such as 66, are properly positioned in the notches of the hitch bars, the implement may be locked to, and thus required to move with the frame supporting the front tool bar 16.

As illustrated in FIG. 1, a rear tool bar 18 may have various implements attached thereto by the use of supports or implement structure 77 supported by U-bolts and the like to the bar itself including parts such as disk wheel 78 of cultivator 79. When the tractor lifts the main frame and the front tool bar 16, the rear tool bar 18 and its implements will also be lifted due to the construction just described. Both tool bars and implements will thus be controllable in vertical displacement relative to the ground by the three-point hitch mechanism of the tractor. Much savings in time and expense as well as dual field tillage operations can occur with one pass over the field, while permitting the raising of both implement bars at row ends and over ditches and the like.

In some tillage operations, it is advantageous to the farmer to be able to control the depth of running of two separate sets of tillage tools independently of each other. In FIGS. 5-7, a preferred construction of a dual implement hitch is illustrated, which provides the tractor operator with an ability to control depth of a first tool bar supported implement with the hydraulics of the tractor three-point hitch and to independently elevate or lower a second tool bar supported implement relative to the first utilizing the hydraulic power of the tractor independent of its three-point hitch. This illustrated hitch, in addition to the independent adjustment of tool depth, retains the ability of the tractor operator to elevate and lower both implement supporting bars relative to the tractor with the powered hydraulic three-point lift mechanism of the tractor so that implements may be raised together whenever desired.

The second implement bar 18, illustrated in FIGS. 1 and 3, with its usual upper arm 63 and lower spaced arms 61 and 62 may be coupled to the main frame supporting the first implement bar 16 in a manner permitting the raising and lowering of the bar relative to the bar 16. This independent adjustment is accomplished, in part, by providing a quick-hitching coupler 80, which has lower upright frame members or legs 81 and 82, each equipped with a hook bracket 83 and 84 respectively, spaced apart according to the standard spacings for attaching the arms or other pin equipped implements, such as by the pin 66. The coupler is provided with a central upright mast 85 similarly equipped with a central hook bracket 86 related in vertical spacing to the lower hook brackets 83 and 84 to engage a pin, such as the pin 65, on the upper arms 63 of a second implement bar 18. Appropriate structurally strong connecting parts 87 and 88 connect the upright parts of the quick coupler with the mast 85. The portions of the main frame are substantially the same in FIGS. 5 and 6 as are illustrated in FIG. 2 and bear similar reference characters.

In order to mount the coupler to the main frame a mounting pin bracket 89 (FIG. 5) at the front lower part of each upright plate 20 and 22 is provided for not only connecting the main frame to the tractor lower links, but also providing a means for mounting the quick-hitching coupler to the main frame. The details of construction of the mounting pin bracket are best shown in FIGS. 6 and 7. The bracket includes a plate 90 secured to the upright outer sidewall of the plate 20 by bolts 91 and 92. Generally, the rear edge of the plate 90 is aligned with the rear edge 25 of the upright plate 20. The base plate 90 has welded to it an outwardly extending brace plate 93, in turn welded to an outer plate 94 spaced outwardly from the outer surface of the upright plate 20 of the main frame. The main frame plates 20 and 22 are generally spaced apart a distance to comply with the standard spacing of Category I three-point hitches so that a shouldered removable pin 95 may pass through an outer opening in the plate 94 and an aligned opening in the plate 20 to mount a Category I lower lift links on the smaller diameter portion 96 and a Category II tractor on a larger portion 97 of the pin 95. The outer plates 94 of the pin bracket are spaced sufficiently widely apart to accommodate the Category II lower link spacing. A bracing plate 98 is welded on the top and spanning the space between the plates 90 and 94 and over the bracing plate 93, but is relieved so as not to interfere with motion of any parts desired.

The quick-hitching coupler 80 is secured to the main frame at its lower ends by a pair of draft links 100, which are of fixed length and attached to the mounting pin brackets by a removable pin 101 passed through the outer plate 94, inner plate 90 and side plate 20 of the main frame through aligned openings properly sized. As illustrated in FIG. 7, the lower hook plate 84 is extended rearwardly of the upright leg 81 in order to provide an opening for the reception of a pin 102 connecting the rearward end of the draft link to the lower end of the coupler. Since the draft links and the connections on the left and right side are identical, similar reference characters are used to identify the same. The upper end of the coupler is secured to the main frame through the use of commercially available adjustable top link 103 secured by a pin 104 in the top mast of the main frame and to a bracket 105 secured to the right-hand side of the mast 85 of the coupler as viewed in FIG. 6. The draft links and the top link support the quick coupler in a front to rear direction, but since the connections are all by pins the quick coupler would not be controlled in elevation relative to the main frame except for additional structure. The pins are commercially available and equipped with cross holes for key retainers.

The elevated position of the quick coupler relative to the main frame is controlled from the hydraulic power source of a tractor through the utilization of an independently controlled double acting lift cylinder 106 having hydraulic hose connections to the tractor through hydraulic ports 107 and 108 so that the position of the piston rod 109 may be controlled relative to the main frame. The lower end of the cylinder is supported upon a rigid cross member 115 spanning the space between the side plates 20 and 22 of the main frame and secured thereto by the bolts 91 and 92, which attach the pin bracket to the lower edge of the plates. The cylinder is equipped with a head end eye 110 secured to the cross member 115 with sufficient clearance to allow the cylinder a few degrees of motion at the rod end relative to the head end so secured. The rod is equipped with an eye 111 also pinned to a bracket 112 secured to the mast 85 of the quick coupler on the side thereof opposite the attachment of the adjustable top link 103 to the coupler so that no interferences occur between the cylinder and the top link 103 during upward or downward movement of the quick coupler relative to the main frame.

During farm tillage, for example, the pulling of chisels through the ground to loosen the soil for moisture penetration followed by a cultivator carried on a second tool bar, such as 18, attached to the coupler 80, the farmer may, from his tractor, control the extension of the rod 109 in the cylinder 106 to provide from 8 to 10 inches of vertical lift or travel of the second implement relative to the first implement supported upon the tool bar 16. At the same time, the three-point, free-link, power lift hitch of the tractor, by the simple elevation of the main frame, will also lift whatever implements are attached to the second tool bar 18. Such action occurs at the end of a row or upon traversing water ditches and the like, which occur frequently within a field. When both ends are so lifted, the spatial relation of the two tool bars will remain provided that no change is made in the extension of retraction of the rod 109 in the auxiliary lift cylinder 106. Should adjustment of the cultivator or other implements carried on the second tool bar be required while traversing a field, such adjustment may be effected through the control of the extension of the cylinder 106 while leaving the tools supported on the tool bar 16 at the height determined by the adjustment of the tractor three-point hitch. The versatility of the present construction will be immediately recognized, in that the tractor power system is utilized fully, both for lifting two implements while permitting adjustment of the height or level of operation of both and each independently of the other.

It should be understood that while reference has been made to specific tillage implements, such as chisels and cultivators, other farm tillage implement tools may be attached to the tool bars 16 and 18 as may be appropriate to the particular farmer's tilling operations.

I claim:

1. Tillage equipment for use with agricultural wheel tractors equipped with a three-point, free-link, power lift hitch, comprising:
    a tillage tool bar to extend laterally of the tractor,
    a central main frame supporting said bar,
    said frame having a pair of upright parallel plates spaced apart substantially at lower hitch point spread and extending front to rear relative to a tractor,
       a central mast box section above the plates at upper hitch point height and
       rigid framing connecting said upright plates and mast section,
    said tool bar extending through said upright plates below said mast and being rigidly supported therein,
       means respectively forming lower tractor link hitch pin connections at the lower front portions of said plates and a tractor upper link pin connection in said mast,
    a rigid cross member joining the lower rearward portion of said upright plates,
    an upright quick-attaching coupler tandem mounted closely to the rear of said main frame, said coupler having a pair of spaced frame parts joined to a central upright mast, hook bracket means carried adjacent the bottom of each of said frame parts and by said coupler mast extending rearwardly therefrom and spaced apart at a standard spacing for attaching connecting means of a tilling tool implement to be hitched to said coupler,
    said mounting including a pair of draft links respectively pivotally joining the lower portion of each plate to the adjacent lower portion of the coupler parts and an adjustable length top link pivotally joining said mast section to the upper portion of the coupler, said link pivots being generally horizontally oriented providing upright swinging of the coupler about said link pivots to the main frame,
    an upright lift cylinder device pivotally connected between said cross member and said coupler with hydraulic connections to a power source,
    said coupler central mast having an upper forwardly extending attachment member positioned over said cross member and a lower forwardly extending attachment member, said attachment members being offset from each other on opposite lateral sides of said coupler central mast with said upper attachment member placed above the lower attachment member, said cylinder device being connected to the upper attachment member and said adjustable link being connected to the lower attachment member so that said link and cylinder member may lift upon said coupler at a point above the upper pivot point of the coupler on said top link with said cylinder device remaining substantially upright, whereby said coupler may be raised and lowered relative to said main frame for adjustable positioning tilling tools hitched to the coupler relative to tilling tools on said tool bar while providing for conjoint elevation and lowering of both main frame and quick-coupler by the tractor power lift hitch.

2. The tillage equipment specified in claim 1 wherein each frame plate has a front to rear dimension in the upright portions exceeding the tool bar front to rear dimension and is relatively of less dimension in the central mast box section above said plates with the front of the frame being in an upright plane so that the three-point hitch pin connection means are generally at the front of the frame.

3. The tillage equipment specified in claim 1 wherein the frame plates engage the main tool bar only where such bar passes through the spaced plates with outer portions of the bar being cantilevered beyond the frame with free length upon which tools may be laterally clamped in desired locations.

4. The tillage equipment specified in claim 1 wherein the central portion of said frame has a box-beam section formed of said upwardly extending side plates, a first spacer bar extending horizontally at the upper end of said side plates and a second spacer bar generally parallel to the first and at the lower end of said side plates with said plates and bars being united forming a front and rear open box section, said upper three-point hitch pin connection means and said adjustable link being extendable respectively into said box section from the front and rear thereof so that stress from the rear implement may be carried directly to the tractor hitch with which used.

* * * * *